(12) United States Patent
Fukuoka et al.

(10) Patent No.: US 6,608,143 B1
(45) Date of Patent: Aug. 19, 2003

(54) ACRYLIC COPOLYMER, ACRYLIC PRESSURE-SENSITIVE ADHESIVE COMPOSITION, ACRYLIC PRESSURE-SENSITIVE ADHESIVE TAPE OR SHEET, AND ACRYLIC ADHESIVE COMPOSITION

(75) Inventors: Masateru Fukuoka, Osaka (JP); Akira Nakasuga, Osaka (JP); Hiraku Miyashita, Minou (JP); Hajime Nosetani, Hasuda (JP)

(73) Assignee: Sekisui Chemical Co., Ld., Osaka (JP)

( * ) Notice: Subject to any disclaimer, the term of this patent is extended or adjusted under 35 U.S.C. 154(b) by 0 days.

(21) Appl. No.: 09/959,637
(22) PCT Filed: Feb. 28, 2000
(86) PCT No.: PCT/JP00/01154
§ 371 (c)(1),
(2), (4) Date: Nov. 6, 2001
(87) PCT Pub. No.: WO00/68288
PCT Pub. Date: Nov. 16, 2000

(30) Foreign Application Priority Data

May 7, 1999 (JP) ............................................. 11-127066

(51) Int. Cl.$^7$ ........................ C08F 255/08; C08F 279/02
(52) U.S. Cl. ........................ 525/309; 525/308; 525/310; 525/263
(58) Field of Search ................................ 525/309, 308, 525/310, 263

(56) References Cited

U.S. PATENT DOCUMENTS 5,625,005 A * 4/1997 Mallya et al.

FOREIGN PATENT DOCUMENTS

EP 0685501 A 12/1995

OTHER PUBLICATIONS

JP, 62–235310, A and English Abstract Thereof Oct. 15, 1987.
JP, 59–75975, Apr. 28, 1984 A corresponding to US Patent Appl. No. 419,025 filed Sep. 16, 1982.
JP, 3–281587, A and English Abstract Thereof Dec. 12, 1991.
JP, 61–103975, A and English Abstract Thereof May 22, 1986.
JP, 54–91540, A and English Abstract Thereof Jul. 20, 1979.
JP, 54–127441, A and English Abstract Thereof Oct. 3, 1979.
WO 9845344A (DSM NV; Sullivan Michael Gordon (US); lapin Stephen (US) Krongauz Oct. 15, 1998.

* cited by examiner

Primary Examiner—James J. Seidleck
Assistant Examiner—Olga Asinovsky
(74) Attorney, Agent, or Firm—Townsend & Banta

(57) ABSTRACT

Acrylic copolymers are provided which have polymeric portions having different polarities or glass transition temperatures, which permit easy selection of combinations of such polymeric portions having different polarities or glass transition temperatures, which increase a design freedom and which are applicable for diverse uses.

Acrylic copolymers including a polymeric backbone portion prepared via copolymerization of (a) an alkyl (meth)acrylate ester containing 1–14 carbon atoms in the alkyl, (b) an olefinic polymer or copolymer terminally modified by a free-radically polymerizable unsaturated double bond and (c) a polymer terminally modified by a free-radically polymerizable unsaturated double bond and having a number average molecular weight of 2,000–30,000 and a glass transition temperature of at least 30° C. and comprised chiefly of the alkyl (meth)acrylate ester, and a polymeric branch portion grafted to the polymeric backbone portion and having a lower polarity and different glass transition temperature than the polymeric backbone portion.

14 Claims, No Drawings

ACRYLIC COPOLYMER, ACRYLIC PRESSURE-SENSITIVE ADHESIVE COMPOSITION, ACRYLIC PRESSURE-SENSITIVE ADHESIVE TAPE OR SHEET, AND ACRYLIC ADHESIVE COMPOSITION

TECHNICAL FIELD

The present invention relates to an acrylic copolymer and an acrylic pressure-sensitive adhesive composition. More particularly, the present invention relates to an acrylic copolymer which contains polymeric portions having distinguished polarities and thus provides an excellent design freedom for application to various uses, also to an acrylic pressure-sensitive adhesive composition using the acrylic copolymer, further to an acrylic pressure-sensitive adhesive tape or sheet, and further to an acrylic hot melt adhesive composition.

BACKGROUND ART

In recent years, there has been an increasing demand for high-performance or high-function polymeric compounds. This has led us to recognize the importance of high-molecular weight polymers, graft and block copolymers containing different polymeric portions. For example, Japanese Patent Laying-Open No. Sho 62-235310 discloses a method for manufacturing a block copolymer by sequentially polymerizing two types of monomer mixtures, with the use of a bifunctional peroxide catalyst containing two types of peroxy bonds that decompose at different temperatures in a molecule, to thereby allow rubber-constituting polymeric portions to undergo copolymerization with resin-constituting polymeric portions.

However, monomers applicable for use in this method are limited to highly polar unsaturated alkyl carboxylate esters and aromatic vinyl compounds. This has inevitably led to an increase in polarity of a resulting block copolymer as a whole.

Japanese Patent Laying-Open No. Sho 59-75975 discloses a method for manufacturing an acrylic graft copolymer by utilizing a macromonomer having a high glass transition temperature. However, this method utilizes high-polarity monomers, as similar to the case of the aforesaid block copolymer, to inevitably result in the increased polarity of a resulting graft copolymer as a whole.

Japanese Patent Laying-Open No. Sho 59-75975 also discloses an acrylic pressure-sensitive adhesive made by utilizing the above-described graft copolymer. However, the highly polar character of the graft copolymer utilized not only limits the types of applicable tackifying resins but also prevents the adhesive to build desired adhesive strength relative to low-polarity adherends.

Notwithstanding the above, the acrylic pressure-sensitive adhesives have gained wider acceptance compared to rubber pressure-sensitive adhesives for their increased cohesion and superior resistance to weather and solvent.

As one exemplary means of enhancing adhesion of the acrylic pressure-sensitive adhesive to an adherend having a low-polarity surface, such as polyethylene or polypropylene, Japanese Patent Laying-Open No. Hei 3-281587 discloses a composition incorporating a resinate ester in an acrylic polymer.

However, the acrylic pressure-sensitive adhesive composition described in the above-identified prior art still suffers from the highly polar character of the acrylic polymer per se. This has limited the types of applicable tackifying resins and led to the failure to reduce the difference in polarity between the adhesive composition and a low-polarity adherend to a level sufficient for them to build a satisfactory adhesive strength.

Apart from the above, synthetic resin films or sheets have achieved wide use for purposes of protecting various parts. That is, such protective films or sheets are widely used for protecting a metal sheet made of stainless steel or aluminum, a precoat steel, a decorative sheet, a plastic sheet or an aluminum sash, while it is machined, cured or transported.

For example, in Japanese Patent Laying-Open No. Sho 61-103975, an adhesive film for surface protection is disclosed which is made by applying onto a polyolefin substrate a pressure-sensitive adhesive layer formed from a composition containing, by weight, 100 parts of A-B-A (A represents a styrene polymer block and B represents an ethylene-butylene copolymer block) and 0–80 parts of a tackifying resin. While providing satisfactory anchoring effect, the adhesive film for surface protection described in this prior art has been still insufficient in terms of weather resistance.

This has led to the use of a protective film prepared by solution coating an acrylic pressure-sensitive adhesive on a vinyl chloride resin or polyolefin substrate for uses requiring outdoor protection, particularly resistance to weather and light. However, since this type of protective film must be removed from a part on which the film has been applied for protection before the part is put into use, it is constructed to be readily releasable from the part. For example, a silicone oil or other release agent is loaded in the acrylic pressure-sensitive adhesive to insure enhanced releasability. However, a surface of the protected part is stained by the release agent, which has been a problem.

Also, solvent-free hot-melt adhesives have gained an increasing notice as a result of the recent severe criticism on environmental pollution caused by solvent-incorporated adhesives, and also from a viewpoint of saving energy and resources. Those comprised principally of an ethylene-vinyl acetate copolymer establish a current mainstream of hot-melt adhesives for their superior hot-melting and flow properties and compatibility with other resins. Notwithstanding these noted advantages, such hot-melt adhesives have the following deficiencies: they are low in initial adhesion (tackiness); they exhibit poor adhesive performances at low temperatures; and they show poor adhesion to olefinic polymers such as polyethylene and polypropylene.

The prior art has attempted to enhance adhesion of such olefinic polymers to low-polarity adherends. An hot-melt adhesive composition (Japanese Patent Laying-Open No. Sho 54-91540) is proposed including a block copolymer consisting of conjugated diolefinic copolymer/monovinyl-substituted aromatic compound, an ethylene-vinyl acetate copolymer, an ethylenic resin, a phenolic resin and a tackifying resin. Also proposed is a hot-melt adhesive composition (Japanese Patent Laying-Open No. Sho 54-127441) prepared by adding a liquid rubber having a specific molecular weight and a tackifying resin to an ethylene-vinyl acetate copolymer.

However, the hot-melt adhesive compositions disclosed in Japanese Patent Laying-Open Nos. Sho 54-91540 and Sho 54-127441 both contain a component having a conjugated double bond and thus exhibit unsatisfactory results in terms of resistance to deterioration by light and heat.

Acrylic hot-melt adhesives have been developed as materials having superior weather and solvent resistance compared to rubber adhesives and used in various uses. One example of such acrylic hot-melt adhesive compositions is disclosed in Japanese Patent Laying-Open No. Sho 59-75975.

Since this acrylic hot-melt adhesive composition comprises an alkyl (meth)acrylate ester and a functional polymer (macromer), it has been difficult to impart well-balanced hot-melt and cohesive properties thereto. That is, such a composition when used as a hot-melt adhesive suffers from the following deficiencies. The composition, when exposed to high temperature over 60° C., tends to flow and move across the application area. If its cohesive property is enhanced to prevent such a flow, its application becomes difficult as a result of the excessively increased melt viscosity.

It is an object of the present invention to provide an acrylic copolymer which contains polymeric portions having different polarities or glass transition temperatures, which permits easy selection of combinations of those polymeric portions having different polarities or glass transition temperatures, which permits a broad design freedom and which is applicable for various uses.

It is another object of the present invention to provide an acrylic pressure-sensitive adhesive composition which is comprised principally of the acrylic copolymer in accordance with the present invention and which shows good adhesion to an adherend regardless of its polarity level.

It is a further object of the present invention to provide an acrylic pressure-sensitive adhesive tape or sheet which can solve the above-described problems encountered in the prior art, i.e., which exhibits good adhesive properties and properly-reconciled removability and adherend non-staining properties and which is also suitably applicable for uses that require resistance to weather and light.

It is a further object of the present invention to provide an acrylic hot-melt adhesive composition which exhibits good adhesive properties.

DISCLOSURE OF THE INVENTION

A first invention of the present application is an acrylic copolymer characterized as being prepared via copolymerization of (a) an alkyl acrylate ester containing 1–14 carbon atoms in the alkyl, (b) an olefinic polymer or copolymer terminally modified by a free-radically polymerizable unsaturated double bond, and (c) a polymer terminally modified by a free-radically polymerizable unsaturated double bond and having a number average molecular weight of 2,000–30,000 and a glass transition temperature of at least 30° C.

A second invention is an acrylic copolymer characterized as being prepared by grafting a polymer (e) to an acrylic copolymer made via copolymerization of (a) an alkyl (meth) acrylate ester containing 1–14 carbon atoms in the alkyl, (d) a polymerizable monomer containing one type of functional group selected from carboxyl, hydroxyl, epoxy and isocyanate and (b) an olefinic polymer or copolymer modified terminally with a free-radically polymerizable unsaturated double bond. The polymer (e) has at its one end one type of functional group reactive with the functional group in the polymerizable monomer (d) and has a number average molecular weight of 2,000–30,000 and a glass transition temperature of at least 30° C.

A third invention of the present application is an acrylic copolymer characterized as being prepared by grafting an olefinic polymer or copolymer (f) to an acrylic copolymer made via copolymerization of (a) an alkyl (meth)acrylate ester containing 1–14 carbon atoms in the alkyl and (d) a polymerizable monomer containing one type of functional group selected from carboxyl, hydroxyl, epoxy and isocyanate. The olefinic polymer or copolymer (f) has at its one end one type of functional group reactive with the functional group in the polymerizable monomer (d).

A fourth invention of the present application is an acrylic copolymer characterized as being prepared by grafting an olefinic polymer or copolymer (f) to an acrylic copolymer made via copolymerization of (a) an alkyl (meth)acrylate ester containing 1–14 carbon atoms in the alkyl, (d) a polymerizable monomer containing one type of functional group selected from carboxyl, hydroxyl, epoxy and isocyanate and (c) a polymer terminally modified by a free-radically polymerizable unsaturated double bond and having a number average molecular weight of 2,000–30,000 and a glass transition temperature of at least 30° C. The olefinic polymer or copolymer (f) has at its one terminal one type of functional group reactive with the functional group in the polymerizable monomer (d).

A fifth invention is an acrylic copolymer characterized as being prepared by the following first and second steps.

In the first step, a compound (I) containing a free-radically polymerizable unsaturated double bond and a peroxide bond in a molecule, an alkyl (meth)acrylate ester (a) containing 1–14 carbon atoms in the alkyl and an olefinic polymer or copolymer (b) terminally modified by a free-radically polymerizable unsaturated double bond are allowed to undergo free-radical polymerization, with the aid of a photoinitiator, in the temperature range where the compound (I) is not caused to decompose. In the second step, a polymerizable monomer component (II) which differs composition from the polymerizable monomer components sed in the preceding free-radical polymerization is allowed to undergo free-radical polymerization, under the presence of the product of the preceding free-radical polymerization, in the temperature range where the compound (I) is caused to decompose.

In the preparation of the acrylic copolymers in accordance with the first, second and fifth inventions, an ethylene-butylene random copolymer or a propylene polymer terminally modified by a free-radically polymerizable unsaturated double bond may preferably be used as the olefinic polymer or copolymer (b).

In the second invention, it is preferred that the functional group in the polymerizable monomer (d) is an epoxy group and the functional group in the polymer (e) is a carboxyl group.

For the acrylic copolymers in accordance with the third and fourth inventions, it is preferred that the functional group in the polymerizable monomer (d) is a carboxyl group. In the fourth invention, preferably, the functional group in the olefinic polymer (c) is an epoxy group.

For the acrylic copolymer in accordance with the fifth invention, it is preferred that the polymerizable monomer component (II) used in the second step has a glass transition temperature of at least 20° C.

The acrylic pressure-sensitive adhesive composition in accordance with the present invention is characterized as being comprised principally of any of the acrylic copolymers in accordance with the first through fifth inventions. In this case, preferably, a hydrogenated petroleum resin may further be included.

In accordance with a further aspect of the present invention, an acrylic pressure-sensitive adhesive tape or sheet is provided which is fabricated by integrating, via coextrusion, a polyolefinic substrate and a pressure-sensitive adhesive layer comprised of the acrylic pressure-sensitive adhesive composition in accordance with the present invention.

Also provided in accordance with a further aspect of the present invention is an acrylic hot-melt adhesive composition comprised principally of any of the acrylic copolymers in accordance with the first through fifth inventions.

The present invention is below described in detail.

(First Invention)

In the first invention, examples of useful alkyl (meth) acrylate esters (a) containing 1–14 carbon atoms in the alkyl include methyl (meth)acrylate, ethyl acrylate, n-propyl (meth)acrylate, isopropyl (meth)acrylate, n-butyl (meth) acrylate, sec-butyl (meth)acrylate, t-butyl (meth)acrylate, cyclohexyl methacrylate, n-octyl (meth)acrylate, isooctyl acrylate, 2-ethylhexyl (meth)acrylate, isononyl acrylate and lauryl (meth)acrylate.

In the present application, (meth)acryl is used to represent acryl and methacryl collectively.

The above-listed alkyl (meth)acrylate esters (a) may be used alone or in combination.

The aforementioned olefinic polymer or copolymer (b) terminally modified by a free-radically polymerizable unsaturated double bond for use in the first invention is not particularly specified, so long as it has a double bond copolymerizable with the other polymerizable monomer and also has a polymer structure composed of repeating olefinic skeletons. The double bond copolymerizable with the other polymerizable monomer, as used herein, refers to a free-radically polymerizable unsaturated double bond. Examples of functional groups having such an unsaturated double bond include a vinyl, (meth)acryloyl, allyl group and the like.

The polymer structure composed of repeating olefinic skeletons can be exemplified by a structure composed of repeating ethylene-butylene skeletons or a polymer structure composed of repeating propylene skeletons, i.e., a propylene polymer. A specific example of the olefinic polymer or copolymer (b) is manufactured by Shell Chemical and marketed in the trade as KRATON LIQUID Polymer L-1253.

The polymer (c) terminally modified by a free-radically olymerizable unsaturated double bond and having a number average molecular weight of 2,000–30,000 and a glass transition temperature of at least 30° C., for use in the first invention, is not particularly specified, so long as it has a double bond copolymerizable with other polymeric monomers and has a number average molecular weight of 2,000–30,000 and a glass transition temperature of at least 30° C. As described earlier in explaining the olefinic polymer or copolymer (b), the double bond copolymerizable with other polymeric monomer refers to a free-radically polymerizable unsaturated double bond. Examples of functional groups having such an unsaturated double bond include a vinyl, (meth)acryloyl and allyl group.

Preferred for use as the olefinic polymer or copolymer (b) is an ethylene-butylene copolymer or propylene polymer each terminally modified by a free-radically polymerizable unsaturated double bond.

A specific example of the polymer (c) is manufactured by Toa Gosei Chem. Co., Ltd. and marketed in trade as AA-6.

In the first invention, besides alkyl (meth)acrylate ester (a), olefinic polymer or copolymer (b) and polymer (c), a vinyl monomer may further be allowed to participate in the copolymerization to control the glass transition temperature or polarity of the resulting acrylic copolymer or to introduce a functional group thereto. Examples of copolymerizable vinyl monomers include styrenic monomers represented by α-methyl styrene, vinyl toluene and styrene; vinyl ether monomers represented by methyl vinyl ether, ethyl vinyl ether and isobutyl vinyl ether; unsaturated carboxylic acids or alkyl carboxylate esters such as fumaric acid, monoalkyl fumarate ester, dialkyl fumarate ester, maleic acid, monoalkyl maleate ester, dialkyl maleate ester, itaconic acid and monoalkyl itaconate ester; (meth)acrylo-nitrile, butadiene, isoprene, vinyl chloride, vinylidene chloride, vinyl acetate, vinyl ketone, vinylpyrrolidone, vinylpyridine, (meth)acrylamide, vinylcarbazole and the like.

The acrylic copolymer in accordance with the first invention, if its weight average molecular weight is excessively low, may fail to exhibit polymeric properties. On the other hand, if its weight average molecular weight is excessively high, the acrylic copolymer while produced may be increased in viscosity to result in low productivity. Accordingly, the weight average molecular weight of the acrylic copolymer is preferably controlled to fall within the range of 10,000–4,000,000, more preferably within the range of 200,000–2,000,000.

The acrylic copolymer in accordance with the first invention can be produced by various processes including solution polymerization and bulk polymerization and is readily obtainable, in general, by allowing the alkyl (meth)acrylate ester (a), olefinic polymer or copolymer (b) and polymer (c) to dissolve in a suitable solvent such as ethyl acetate and then subjecting the mixture to solution polymerization using a polymerization initiator.

Other applicable method involves providing a solvent-free liquid mixture containing the alkyl (meth)acrylate ester (a), olefinic polymer or copolymer (b), polymer (c) and photoinitiator and then irradiating the mixture with an ultraviolet light to initiate polymerization thereof in a nitrogen or other inert atmosphere.

The blending proportions of the alkyl (meth)acrylate ester (a), olefinic polymer or copolymer (b) and polymer (c) in the first invention will be now described.

The reduced amount of the olefinic polymer or copolymer (b) results in the failure to impart desired properties to the acrylic copolymer. On the other hand, the excessive amount thereof lowers compatibility to result in the reduced utility. Accordingly, the olefinic polymer or copolymer (b) is preferably contained in the amount of 5–100 parts by weight, more preferably 10–50 parts by weight, based on 100 parts by weight of the alkyl (meth)acrylate ester (a).

The excessive reduction in amount of the polymer (c) results in the failure to impart polymeric cohesion to the acrylic copolymer, while the excessive increase in amount thereof causes gellation to result in the reduced utility. Accordingly, the polymer (c) is preferably contained in the amount of 5–100 parts by weight, more preferably 10–30 parts by weight, based on 100 parts by weight of the alkyl (meth)acrylate ester (a).

(Second Invention)

The alkyl (meth)acrylate ester (a) containing 1–14 carbon atoms in the alkyl for use in the second invention is similar in type to that for use in the first invention. Accordingly, its detail is omitted here by referring to the description given in explaining the first invention.

The polymerizable monomer (d) containing one type of functional group selected from carboxyl, hydroxyl, epoxy and isocyanate is not particularly specified, so long as it is a polymerizable monomer containing any one type of those functional groups.

Examples of carboxyl-containing polymerizable monomers (d) include carboxylic acids such as (meth)acrylic acid, itaconic acid, crotonic acid, maleic acid (anhydride) and fumaric acid (anhydride); carboxyl-containing (meth) acrylate esters such as carboxyethyl acrylate and the like.

Examples of hydroxyl-containing polymerizable monomers (d) include 2-hydroxyethyl (meth)acrylate, hydroxypropyl acrylate, 4-hydroxybutyl acrylate, caprolactone-modified (meth)acrylate, polyoxy-ethylene oxide-modified (meth) acrylate and the like.

Examples of epoxy-containing polymerizable monomers (d) include an glycidyl methacrylate ester and the like. Examples of isocyanate-containing polymerizable monomers (d) include methacryloyl isocyanate and the like.

The olefinic polymer or copolymer (b) terminally modified with a free-radically polymerizable unsaturated double bond for use in the second invention is similar in type to that used in the first invention. Accordingly, its detail is omitted here by referring to the description given in explaining the first invention.

In the second invention, the olefinic polymer or copolymer (b) preferably comprises an ethylene-butylene random copolymer or propylene polymer, terminally modified with a free-radically polymerizable unsaturated double bond. More preferably, the olefinic polymer or copolymer (b) comprises the above ethylene-butylene random copolymer or propylene polymer, the polymerizable monomer (d) comprises a monomer containing an epoxy as a functional group, and the polymer (e) comprises a polymer containing a carboxyl as a functional group.

In the second invention, the acrylic copolymer (X-1) prepared via copolymerization of the aforementioned alkyl meth)acrylate ester (a), polymerizable monomer (d) and olefinic polymer or copolymer (b) is used. This acrylic copolymer may further be copolymerized with the other vinyl monomer to control its glass transition temperature or polarity or to introduce other functional group, as similar to the case of the first invention. Such a copolymerizable vinyl monomer is similarly in type to that used in the first invention, and accordingly its detail is omitted here by referring to the description given in the first invention.

In the second invention, the polymer (e) is further grafted to the acrylic copolymer (X-1). The polymer (e) has at its one end one type of functional group reactive with the functional group in the polymerizable monomer (d) and has a number average molecular weight of 2,000–30,000 and a glass transition temperature of at least 30° C.

Examples of polymers (e) containing at its one end one type of functional group reactive with the functional group in the polymerizable monomer (d) and having a number average molecular weight of 2,000–30,000 and a glass transition temperature of at least 30° C. include homopolymers or copolymers derived from styrene, methyl methacrylate ester, α-methylstyrene, o-methylstyrene, p-methylstyrene, acrylonitrile, vinyl acetate and the like. These may be used alone or in combination. Alternatively, the polymer (e) may be obtained by allowing a polymerizable monomer containing such a functional group as styrene, methyl ethacrylate ester, α-methylstyrene, o-methylstyrene, p-ethylstyrene, acrylo-nitrile or vinyl acetate to undergo opolymerization with the other monomer copolymerizable with the aforementioned polymerizable monomer, with the use of a chain transfer agent such as mercaptoethanol if desired to introduce a hydroxyl group at one end of the polymer, or alternatively, mercaptoacetic acid or propionic acid if desired to introduce a carboxyl group at one end of the polymer.

If the content of the polymer (e) having a functional group at its one end is excessively low, in an exemplary case where the acrylic copolymer in accordance with the second invention is utilized as a pressure-sensitive adhesive, the cohesion of the pressure-sensitive adhesive may become too low to obtain satisfactory heat resistance. By contrast, if its content is excessively high, the pressure-sensitive adhesive itself may become excessively hard to reduce its adhesive properties. It is accordingly preferred that 5–100 parts by weight of the polymer (e) is grafted to 100 part by weight of the acrylic copolymer X-1).

As similar to the acrylic polymer in accordance with the first invention, the acrylic polymer in accordance with the second invention, if its weight average molecular weight is excessively low, may fail to exhibit characteristics as a polymer. On the other hand, if its weight average molecular weight is excessively high, the acrylic copolymer while produced may be increased in viscosity to result in low productivity. Accordingly, the weight average molecular weight of the acrylic copolymer is preferably controlled to fall within the range of 10,000–4,000,000, more preferably within the range of 200,000–2,000,000.

Also in the second invention, polymerization of the acrylic copolymer (X-1) can be achieved by varous techniques including solution polymerization, bulk polymerization, suspension polymerization and emulsion polymerization. The general method used to readily obtain the acrylic copolymer involves allowing the alkyl (meth) acrylate ester (a) and other essential ingredients, optionally with additives, to dissolve in a suitable solvent, e.g., ethyl acetate, and then subjecting the mixture to solution polymerization using a polymerization initiator.

Also in the second invention, a conventional technique can be utilized to graft the polymer (e) to the acrylic copolymer (X-1).

In the preparation of the acrylic polymer in accordance with the second invention, if the blending proportion of the polymerizablem monomer (d) is excessively low, a desired graft effect may not be obtained. On the other hand, if it is excessively high, the acrylic polymer may be increased in polarity to an excessive extent. It is thus preferred that the polymerizable monomer (d) is contained in the range of 0.1–10 parts by weight, more preferably in the range of 1–5 parts by weight, based on 100 parts by weight of the alkyl (meth)acrylate ester (a).

If the blending proportion of the olefinic polymer or copolymer (b) is excessively low, desired properties may not be obtained. On the other hand, if it is excessively high, the compatibility may be lowered to result in the reduced utility. Accordingly, the olefinic polymer or copolymer (c) is preferably contained in the amount of 5–100 parts by weight, more preferably 10–50 parts by weight, based on 100 parts by weight of the alkyl (meth)acrylate ester (a)

(Third Invention)

The alkyl (meth)acrylate ester (a) containing 1–14 carbon atoms in the alkyl and the polymerizable monomer (d) containing one type of functional group selected from carboxyl, hydroxyl, epoxy and isocyanate, for use in the third invention are similar in types to those used in the first and second inventions. Accordingly, the preceding descriptions thereon can be referred to.

In the third invention, the aforementioned alkyl (meth) acrylate ester (a) and polymerizable monomer (d) are allowed to undergo copolymerization. As similar to the first or second invention, other vinyl monomer may further be allowed to participate in the copolymerization to control a glass transition temperature or polarity of the resulting acrylic copolymer or to introduce another functional group thereinto. The detail of the other vinyl monomer is omitted here by referring to the description given in explaining the first invention.

In the third invention, the polymerizable monomer (d) preferably contains a carboxyl group.

More preferably, the polymerizable monomer (d) contains a carboxyl group and the olefinic polymer (c) contains an epoxy group.

In the third invention, the olefinic polymer or copolymer (f) having at its one end one type of functional group reactive with a functional group in the polymerizable monomer (d) is grafted to the acrylic copolymer (X-2) made via copolymerization of at least the aforementioned alkyl (meth) acrylate ester (a) and polymerizable monomer (d).

The olefinic polymer or copolymer (f) is not specified particularly, so long as it contains at its one end one type of functional group reactive with a functional group in the polymerizable monomer (d) and has a number average molecular weight and glass transition temperature within the above-specified resepective ranges. Examples of such olefinic polymers or copolymers (f) include those having a polymer structure composed of repeating ethylene-butylene skeletons. specific example of such an olefinic polymer or copolymer manufactured by Shell Chemical and marketed in trade as ATON LIQUID Polymer EKP-207.

For the same reasons as provided in the first and second inventions, it is preferred that the acrylic copolymer in accordance with the third invention has a eight average molecular weight within the range as specified above for the acrylic polymers in accordance with the first and second inventions.

In the preparation of acrylic copolymers in accordance with the third invention, various techniques can be utilized to polymerize the acrylic copolymer (X-2) and graft the olefinic polymer (f) to the acrylic copolymer (X-2), as similar to the second invention.

In the third invention, if the polymerizable monomer (d) content is excessively low, a desired graft effect may not be obtained. If it is excessively high, the acrylic polymer may be increased in polarity to an excessive extent. Accordingly, the polymerizable monomer (d) is preferably incorporated in the range of 0.1–10 parts by weight, more preferably in the range of 1–5 parts by weight, based on 100 parts by weight of the alkyl (meth)acrylate ester (a).

If the olefinic polymer (f) content is excessively low, desired properties may not be obtained. On the other hand, if it is excessively high, the compatibility may be lowered result in the reduced utility. Accordingly, the olefinic polymer (f) is preferably added in the amount of 5–100 arts by weight, more preferably 10–50 parts by weight, based on 100 parts by weight of the acrylic copolymer (X-2).

(Fourth Invention)

The acrylic copolymer (X-3) for use in the preparation of the acrylic copolymer in accordance with the fourth invention is prepared via copolymerization of (a) an alkyl (meth) acrylate ester containing 1–14 carbon atoms in the alkyl, (d) a polymerizable monomer containing one type of functional group selected from carboxyl, hydroxyl, epoxy and isocyanate and (c) a polymer terminally modified by a free-radically polymerizable unsaturated double bond and having a number average molecular weight of 2,000–30,000 and a glass transition temperature of at least 30° C. These alkyl (meth)acrylate ester (a), polymerizable monomer (d) and polymer (c) are similar to those used in the first and second inventions. Accordingly, their details are omitted here by referring to the descriptions given in explaining the first and second inventions.

In the fourth invention, the acrylic copolymer (X-3) can also be used which is made by further participation of the other vinyl monomer in the copolymerization, as stated in the first invention.

In the fourth invention, the olefinic polymer or copolymer (f) having at its one end one type of functional group reactive with a functional group in the polymerizable monomer (d) is grafted to the acrylic copolymer (X-3). The olefinic polymer or copolymer (f) is similar to that used in the third invention. Accordingly, its detail is omitted here by referring to the description given in explaining the third invention.

For the same reasons as provided in the first and second inventions, it is desired that the acrylic copolymer in accordance with the fourth invention has a weight average molecular weight within the range as above specified for the acrylic polymers in accordance with the first and second inventions.

In the preparation of acrylic copolymers in accordance with the third invention, various techniques can be utilized to polymerize the acrylic copolymer (X-3) and graft the olefinic polymer or copolymer (f) to the acrylic copolymer (X-3), as similar to the second invention.

In the fourth invention, if the blending proportion of the polymerizable monomer (d) is excessively low, a desired graft effect may not be obtained. If it is excessively high, the acrylic polymer may be increased in polarity to an excessive extent. Accordingly, the polymerizable monomer (d) is preferably incorporated within the range of 0.1–10 parts by weight, more preferably within the range of 1–5 parts by weight, based on 100 parts by weight of the alkyl (meth) acrylate ester (a).

If the blending proportion of the polymer (c) is excessively low, good cohesion as a graft effect may not be obtained. On the other hand, if it is excessively high, the acrylic copolymer may be increased in hardness to an excessive extent. It is accordingly preferred that the polymer (c) is incorporated in the amount of 5–100 parts by weight, more preferably 10–30 parts by weight, based on 100 part by weight of the alkyl (meth)acrylate ester (a).

Also in the fourth invention, if the blending proportion of the olefinic polymer (f) is excessively low, desired properties may not be obtained. On the other hand, if it is excessively high, the compatibility may be lowered to result in the reduced utility. Accordingly, the olefinic polymer (f) is preferably added in the amount of 5–100 parts by weight, more preferably 10–50 parts by weight, based on 100 parts by weight of the acrylic copolymer (X-3).

(Fifth Invention)

As stated earlier, the first and second steps are utilized to prepare the acrylic copolymer in accordance with the fifth invention. In the first step, the compound (I) containing a free-radically polymerizable unsaturated double bond and a peroxide bond in a molecule, alkyl (meth)acrylate ester (a) containing 1–14 carbon atoms in the alkyl and olefinic polymer or copolymer (b) terminally modified by a free-radically polymerizable unsaturated double bond are allowed to undergo free-radical polymerization, with the aid of a photoinitiator, in the temperature range where the compound (I) is not caused to decompose.

The compound (I) is not particularly specified in type, so long as it contains, in a molecule, a free-radically polymerizable unsaturated double bond and a peroxide bond which when heated decompose to generate radicals. The meaning of the free-radically polymerizable unsaturated bond is described earlier. Examples of functional groups having such a free-radically polymerizable unsaturated double bond include a vinyl, (meth)acryloyl, allyl group and the like.

Peroxides having a peroxide bond can be classified into the following initiator groups according to the ease of radical generation; high-temperature initiators suitable for use at temperatures over 100° C., (medium-temperature) initiators suitable for use at temperatures between 40° C. and 100° C., low-temperature initiators suitable for use at temperatures between −10° C. and 40° C., and ultralow-temperature initiators suitable for use at temperatures below −10° C. (Chemistry of Polymer Synthesis, revised edition, Takayuki Ohtsu). Preferred for use in the present invention are those compounds classified as the medium- to high-temperature initiators suitable for use at temperatures of 40° C. and over. The use of such compounds results in the efficient production of graft polymers. As an example of such a compound (I), t-butyl peroxyallyl carbonate (PEROMER AC, name used in trade and manufactured by NOF Corporation) is sold in the market.

The process used to achieve free-radical polymerization in the first step is not particularly specified, and may be chosen from various polymerization processes including bulk polymerization, solution polymerization, suspension polymerization and emulsion polymerization.

The temperature range, in the first step, where the compound (I) is not caused to decompose can be set on the basis of a 10 hour half-life temperature which is generally used as an indication of a decomposition rate of an organic peroxide. It is desired that the temperature be set within the range that is preferably 20° C., more preferably 30° C., lower than the 10 hour half-life temperature of the compound (I) used. If the temperature is set at an excessively high value, decomposition of the compound (I) may be caused to occur in the first step. This causes gellation to result in the failure to obtain the acrylic copolymer efficiently.

The photoinitiator for use in the first step must be the one which does not generate free-radicals via thermal decomposition. Examples of such photoinitiators include acetophenones such as 4-(2-hydroxyethoxy)phenyl-(2-hydroxy-2-propyl)ketone (product name: DAROCUR 2959, manufactured by Merck & Co. Inc.), α-hydroxy-α,α'-dimethylacetophenone (product name: DAROCUR 1173, manufactured by Merck & Co. Inc.), methoxy-acetophenone, 2,2-dimethoxy-2-phenyl-acetophenone; benzoin ethers such as benzoin ethyl ether and benzoin isopropyl ether; and ketals such as benzyl dimethyl ketal. Other examples include bis(2,6-dimethoxybenzoyl)-2,4,4-trimethyl-pentylphosphineoxide (product name: BDTPO, manufactured by Ciba Geigy Co.), halogenated ketones, acylphosphine oxides, acylphosphinates and the like.

The alkyl (meth)acrylate ester (a) and olefinic polymer or copolymer (b) for use in the first step are similar to those described in the first and third inventions. Their details are accordingly omitted here by referring to the preceding descriptions given in explaining the first and third inventions.

Also in the first step, other vinyl monomer than the aforementioned alkyl (meth)acrylate ester (a), olefinic polymer or copolymer (b) and compound (I) may further be allolwed to participate in the copolymerization. The vinyl monomers described in the first invention are also useful for the other vinyl monomer.

In the second step, a polymerizable monomer component (II) which deffers in composition from the polymerizable monomer components used in the preceding free-radical polymerization is allowed to undergo free-radical polymerization, under the presence of the product from the preceding free-radical polymerization, in the temperature range where decomposition of the compound (I) is caused to occur.

The second step temperature range where decomposition of the compound (I) occurs can be set in a similar manner to the first step temperature range where decomposition of the compound (I) does not occur, i.e., on the basis of the 10 hour half-life temperature. In the second step, it is desired that the temperature be set within the range that does not fall preferably below (10 hour half-life tempreaure of the compound (I)—30)° C., more preferably below (10 hour half-life temperature of the compound (I)—20)° C. If the set temperature is excessively low, the free-radical polymerization in the second step may not be initiated efficiently upon exposure to heat. This reduces the graft efficiency of the resulting acrylic copolymer.

Examples of polymerizable monomer components (II) having glass transition temperatures of not below 20° C. for use in the preparation of copolymers include styrene, methyl methacrylate ester, α-methyl styrene, o-methyl styrene, p-methyl styrene, acrylonitrile, vinyl acetate and the like. The use of methyl methacrylate ester and styrene is preferred.

For the same reasons as provided in the first and second inventions, it is desired that the acrylic copolymer in accordance with the fifth invention has a weight average molecular weight within the range as above specified for the acrylic polymers in accordance with the first and second inventions.

For the acrylic copolymer in accordance with the fifth invention, if the blending proportion of the compound (I) is excessively low, the reduced graft effect may result. If it is excessively high, a proportion of the compound (I) that does not participate in the polymerization may increase. Accordingly, the compound (I) is preferably incorporated in the amount of 0.01–10 parts by weight, more preferably 0.1–5 parts by weight, based on 100 part by weight of the alkyl (meth)acrylate ester (a).

Also, if a blending proportion of the olefinic polymer or copolymer (b) is excessively low, desired properties may not be obtained. On the other hand, if it is excessively high, the compatibility may be lowered to result in the reduced utility. Accordingly, the olefinic polymer or copolymer (b) is preferably incorporated in the amount of 5–100 parts by weight, more preferably 10–50 parts by weight, based on 100 parts by weight of alkyl (meth)acrylate ester (a).

In the fifth invention, if a blending proportion of the polymerizable monomer component (II) is excessively low, good cohesion as a graft effect may not be obtained. If it is excessively high, the resulting acrylic copolymer may be increased in hardness to an excessive extent. Accordingly, the polymerizable monomer component (II) is preferably added in the amount of 5–100 parts by weight, more preferably 10–30 parts by weight, based on 100 part by weight of the alkyl (meth)acrylate ester (a).

(Acrylic Pressure-Sensitive Adhesive Composition)

The acrylic pressure-sensitive adhesive composition in accordance with the present invention is characterized as being comprised primarily of any of acrylic copolymers in accordance with the above-described first through fifth inventions. That is, since the acrylic copolymer according to any one of the first through fifth inventions has a graft structure wherein a lower-polariy polymer branches off from a higher-polarity copolymer backbone comprised primarily of an alkyl (meth)acrylate ester, the pressure-sensitive adhesive composition comprised primarily of such an acrylic copolymer exhibits superior adhesive performances relative to surfaces of adherends varied in polarity over a wide range, including high-polarity metal adherends and low-polarity plastic adherends.

Preferably, a hydrogenated petroleum resin, other than the acrylic copolymer, may further be incorporated in the acrylic pressure-sensitive adhesive composition.

The hydrogenated petroleum resin refers to an alicyclic petroleum resin which results from hydrogenation of a C9 petroleum resin obtained via cationic polymerization of a C9 fraction derived from naphtha cracking or from hydrogenation of a petroleum resin obtained via thermal polymerization of a C5 fraction comprised chiefly of cyclopentadiene or C5 fraction derived dicyclopentadiene.

The C9 fraction contains such polymerizable components as α-methylstyrene, vinyltoluene, vinylxylene, propenylbenzene, indene and methylindene, and is generally available in the form of a mixture of those polymeric components.

Such a petroleum resin is generally hydrogenated under the conditions of 200–300° C. and 10–300 kg/cm$^2$, using a hydrogenation catalyst as illustrated by metals such as nickel, palladium, cobalt, ruthenium, platinum and rhodium and their mixtures.

The hydrogenated petroleum resin for use in the present invention preferably has a number average molecular weight of 500–1,000 and a softening point of 60–150° C. Preferably, it is a 100% hydrogenated resin, i.e., a so-called completely hydrogenated product. Such a resin is commercially available, for example, from Arakawa Chemical Industries, Ltd. under the trade designation of ARKON P140.

Although not particularly specified, the hydrogenated petroleum resin is preferably incorporated in the amount of 5–50 parts by weight, based on 100 parts by weight of the acrylic copolymer in accordance with any of the first through fifth inventions. If the amount is below 5 parts by weight, desired adhesion to olefin or oil surface may not result. If it exceeds 50 parts by weight, its compatibility with the acrylic copolymer may drop to result in the reduced stability of a resulting pressure-sensitive adhesive.

In the case where the pressure-sensitive adhesive composition in accordance with the present invention is used to form a pressure-sensitive tape or sheet, it may be applied, in the form of a layer, to one surface of a substrate, or alternatively, to both surfaces thereof to provide a so-called double coated tape. In the case of the pressure-sensitive adhesive double coated tape, the pressure-sensitive adhesive composition in accordance with the present invention may be applied to provide a pressure-sensitive adhesive layer on at least one surface of the tape.

The material used to form the substrate may be suitably chosen from paper; non-woven fabric; plastic films such as made of polyesters and polyolefins; and plastic foams such as derived from polyolefins, polyurethanes, polychloroprene, soft vinyl polychloride and acrylic resins. Alternatively, the substrate may be excluded to provide a self-supporting pressure-sensitive adhesive sheet.

(Other Additives)

The acrylic copolymer and acrylic pressure-sensitive adhesive composition in accordance with the present invention may further contain a crosslinking agent within the range that does not interfere with the purposes of the present invention to insure increased cohesion. Examples of such crosslinking agents are conventionally known in the art and include isocyanate, aziridine and epoxy crosslinking agents. Electron beam or other radiation crosslinking may be carried out.

When necessary, the acrylic copolymer and acrylic pressure-sensitive adhesive composition in accordance with the present invention may further contain various additives conventionally known in the art, including a tackifier, plasticizer, softener, filler, stabilizer, anti-oxidant, pigment and dye, for example.

(Acrylic Pressure-Sensitive Tape or Sheet)

In accordance with a further aspect of the present invention, an acrylic pressure-sensitive tape or sheet is provided comprising a polyolefinic substrate and a pressure-sensitive adhesive layer comprised of the acrylic pressure-sensitive adhesive composition in accordance with the present invention as described above, which are integrated via coextrusion.

Any polyolefinic substrate may be used if it takes the form of a flexible film or sheet containing ethylene and/or propylene, e.g., polyethylene and/or polypropylene, as a primary constituent.

Examples of polyethylenes include high density polyethylene (HDPE), medium density polyethylene (MDPE), low density polyethylene (LDPE) and linear low density polyethylene (LLDPE). These may be copolymerized with a long-chain olefinic monomer such as 1-butene or 1-pentene.

Examples of polypropylenes include random, homo, highly crystalline, block polypropylenes, and other flexible types.

In the acrylic pressure-sensitive tape or sheet in accordance with the present invention, the aforementioned polyolefinic substrate and pressure-sensitive adhesive layer are integrated via coextrusion. The technique utilized to integrate them by coextrusion is not particularly specified. To illustrate one technique, such a tape or sheet can be obtained by concurrently extruding a polyolefinic substrate material and a pressure-sensitive adhesive layer material from separate extruders and then coextruding them by using a blown film, T-die or other extrusion process.

The acrylic pressure-sensitive adhesive tape or sheet thus obtained via coextrusion may be irradiated with an electron beam to crosslink the acrylic pressure-sensitive layer or to improve an anchor effect relative to associated adherends.

Also, an interlayer may be provided between the polyolefinic substrate and acrylic pressure-sensitive adhesive layer to improve anchor therebetween. The resin for use as the interlayer is not particularly specified, so long as it is effective to anchor the pressure-sensitive adhesive layer. Examples of interlayer resins include high-polarity resins such as EEA resins (ethylene-ethyl acrylate copolymers, e.g., PRIMACOR manufactured by Dow Chemical Company), maleic anhydride added polyethylene and epoxy modified polyethylenes. Modified polyethylenes, modified polypropylenes or other modified polyolefins are suitably used.

(Acrylic Hot-Melt Adhesives)

The acrylic hot-melt adhesive provided in accordance with a further aspect of the present invention is comprised chiefly of the acrylic copolymer in accordance with any one of the first through fifth inventions. When necessary, the acrylic hot-melt adhesive composition may further contain, as auxiliary ingredients, various additives conventionally known in the art such as a tackifier, plasticizer, softener, anti-oxidant, pigment and dye, for example. Alternatively, the hot-melt adhesive may be comprised solely of the acrylic copolymer.

(Action)

The acrylic copolymers in accordance with the first through fifth inventions have a graft structure in which the aforementioned olefinic polymer or copolymer (b) and polymer (c) having a high glass transition temperature branch off from the copolymer backbone comprised chiefly of alkyl (meth)acrylate ester (a). Since its polymeric backbone portion is comprised chiefly of the highly polar alkyl (meth)acrylate ester (a) and distinguished in polarity from its polymeric branch portions, a suitable polarity control of the polymeric branch portions results in obtaining an acrylic copolymers containing a higher-polarity backbone portion and lower-polarity branch portions.

Because of inclusion of such polymeric portions having different polarities, the acrylic copolymer in accordance with the present invention can be used, for example, as an agent for dispersing polybutadiene rubber in an AS resin (acrylonitrile-styrene copolymer resin) or as an impact modifying resin.

The use of the acrylic copolymer having such polymeric portions with different polarities enables application of resulting pressure-sensitive adhesives to high-polarity metals, low-polarity plastics and other adherends without failure to exhibit superior adhesive properties. That is, pressure-sensitive adhesives can be provided which are applicable to adherends varied in polarity over a wide range.

In addition, the acrylic copolymers in accordance with the present invention have polymeric branch portions of high glass transition temperatures in their structures. In the case where the polymeric backbone portion is comprised chiefly of the alkyl (meth)acrylate ester (a) having a low glass transition temperature, the formation of a continuous phase by the polymeric portions having high glass transition temperatures results in provision of the acrylic copolymers which are suitable for use as high heat-resistant or impact-resistant compounds or toner resins. On the other hand, the formation of a continuous phase by polymeric portions having low glass transition temperatures results in the provision of the acrylic copolymers which are suitable for use in the preparation of high-strength or high-orientation films, hot-melt adhesives or thermoplastic elastomers.

The acrylic copolymer in accordance with the first invention is a graft copolymer in which the polymeric backbone portion derived from alkyl (meth)acrylate ester (a) containing 1–14 carbon atoms in the alkyl is combined with the polymeric branch portion derived from the olefinic polymer or copolymer (b) or the polymer (c). Accordingly, acrylic copolymers applicable for various uses can be provided by suitably designing the polarities and glass transition temperatures of those polymeric portions according to the purposes contemplated.

The acrylic copolymer in accordance with the second invention has a graft structure wherein polymeric portions respectively derived from the olefinic polymer copolymer (b) and the polymer (e) branch off from the copolymer backbone comprised chiefly of the alkyl (meth)acrylate ester (a).

That is, the acrylic copolymer includes a polymeric backbone portion comprised chiefly of a highly polar alkyl (meth)acrylate ester, as similar to the acrylic copolymer of the first invention. By rendering any polymeric branch portion less polar, acrylic copolymers can be provided comprising a combination of polymeric portions having different polarities. Thus, suitably selecting combinations of such polymeric portions results in acrylic copolymers applicable for various uses, as similar to the first invention.

The acrylic copolymer in accordance with the third invention has a graft structure in which the olefinic polymer (f) branches off from a polymeric backbone portion made via copolymerization of alkyl (meth)acrylate ester (a) and polymerizable monomer (d) and comprised chiefly of alkyl (meth)acrylate ester (a).

That is, it has a polymeric backbone portion comprised chiefly of a highly polar alkyl (meth)acrylate ester and also has a polymeric branch portion lower in polarity than the polymeric backbone portion, as similar to the acrylic copolymer of the first invention. Acrylic copolymers are thus provided comprising combinations of polymeric portions of different polarities. Accordingly, suitably selecting combinations of such polymeric portions results in acrylic copolymers which are applicable for various uses, as similar to the first invention.

Similarly, in the acrylic copolymer in accordance with the fourth invention, the olefinic polymer or copolymer (f) is grafted to branch off from the copolymer backbone portion made via copolymerization of the alkyl (meth)acrylate ester (a), polymerizable monomer (d) and polymer (c) and comprised chiefly of alkyl (meth)acrylate ester (a).

That is, the acrylic copolymer includes the highly polar polymeric backbone portion and the polymeric branch portion lower in polarity than the polymeric backbone portion, as similar to the first invention. Acrylic copolymers are accordingly provided having a combination of polymer portions having different polarities. Thus, suitably selecting combinations of such polymeric portions results in acrylic copolymers which are applicable for various uses, as similar to the first invention.

Similarly, the acrylic copolymer in accordance with the fifth invention has a graft structure in which the polymeric portion obtained via polymerization of the polymerizable monomeric component (II) branches off from a copolymer backbone portion made via copolymerization of the alkyl (meth)acrylate ester (a), olefinic polymer or copolymer (b) and compound (I).

That is, the acrylic copolymer contains a polymeric backbone portion comprised chiefly of the highly polar alkyl (meth)acrylate ester, as similar to the first invention. By rendering the polymeric branch portion less polar, acrylic copolymers can be provided comprising a combination of polymeric portions having different polarities. Thus, suitably selecting combinations of such polymeric portions results in acrylic copolymers applicable for various uses, as similar to the first invention.

The acrylic pressure-sensitive adhesive composition in accordance with the present invention is comprised chiefly of any of the acrylic copolymers in accordance with the first through fifth inventions. Thus, selective combination of polymeric portions in the acrylic copolymer results in adhesive compositions which exhibit high adhesive strength with respect to adherends varied in polarity.

Also, the acrylic copolymers in accordance with the first, second and fourth inventions contain the polymer (c) having a glass transition temperature of at least 30° C. and are designed to incorporate a polymer backbone portion comprised mainly of the alkyl (meth)acrylate ester (a) that has a low glass transition temperature. Accordingly, the formation of a continuous phase by polymer portions derived from the polymers (c), (e) that show high glass transition temperatures results in the provision of acrylic copolymers which have imparted thereto increased resistance to heat and impact. Such acrylic copolymers are preferred for use as compounds requiring high resistance to heat and impact or as toner resins. Also, the formation of a continuous phase by polymeric portions derived from polymers that show low glass transition temperatures results in the provision of acrylic copolymers suitable for use as films requiring high strength and elongation, hot-melt pressure-sensitive adhesives, thermoplastic elastomers and the like.

Also, the devised combinations of the aforementioned polymeric portions results in the acrylic pressure-sensitive adhesive compositions which have imparted thereto the heat resistance and low-temperature tackiness well-balanced at high levels.

In the aforesaid other aspect of the present invention, the acrylic pressure-sensitive adhesive layer consisting of the above-described acrylic pressure-sensitive adhesive composition is coextruded with the polyolefinic substrate for integration into an acrylic pressure-sensitive adhesive tape or sheet. Accordingly, such a tape or sheet exhibits good adhesive properties and well-balanced removability and non-staining properties with respect to adherends. Further, it is applicable for such uses that require resistance to weather and light.

Also, the acrylic hot-melt adhesive composition in accordance with the present invention is comprised chiefly of the acrylic copolymer in accordance with the present invention. Accordingly, it shows good adhesive properties over a wide temperature range. Further, the improved weather resistance of the adhesive composition and its capability to well-balance melt viscosity and cohesion make it suitable for use in the form of a hot melt.

BEST MODES FOR CARRYING OUT THE INVENTION

The present invention will be clarified by the following non-limiting examples.

EXAMPLE 1

141 g of butyl acrylate (hereinafter referred to as BA), 150 g of 2-ethylhexyl acrylate (hereinafter referred to as 2EHA), 9 g of acrylic acid (hereinafter referred to as AAc), 0.9 g of 2-hydroxyethyl acrylate (hereinafter referred to as 2HEA), 122.73 g of ethyl acetate and 122.73 g of toluene were charged into a 2 liter separable flask equipped with a stirrer, cooling condenser, thermometer and nitrogen inlet to provide a liquid-form monomer mixture.

The monomer mixture was bubbled with nitrogen for 20 minutes to remove dissolved oxygen, and then elevated in temperature using a water bath while stirred at a velocity of 100 rpm.

At the point when the appearance of a reflux liquid was observed, 0.03 g of 1,1-di(t-hexylperoxy)-3,3,5-trimethyl cyclohexane (product name: PERHEXA TMH, manufactured by NOF Corp.) was dissolved in about 1 g of ethyl acetate and then added, as a polymerization initiator, to the monomer mixture to initiate boiling-point polymerization.

After the passage of one hour, 0.05 g of PERHEXA TMH was dissolved in about 1 g of ethyl acetate and again added to the mixture. After the passage of 2, 3 and 4 hours from the start of polymerization, 0.06 g, 0.3 g and 0.9 g of di(3,5,5-trimethylhexanoyl)peroxide (product name: PEROYL 335, manufactured by NOF Corp.), respectively dissolved in about 1 g of ethyl acetate, were added. The boiling-point polymerization was continued for 7 hours to obtain an acrylic copolymer.

The acrylic polymer was determined to have a weight average molecular weight of 764,000 and a polydispersity $(M_w/M_n)$ of 2.6.

Subsequently, 33 g of a 50 wt. % solution of an olefinic polymer having a terminal epoxy group (product name: KRATON LIQUID Polymer EK-207, manufactured by Shell Chemical Comp.) in toluene was added to 100 g of the above-obtained acrylic copolymer and mixed with stirring to obtain an aimed acrylic pressure-sensitive adhesive.

EXAMPLE 2

11 g of a 50% solution of hydrogenated petroleum resin (product name: ARKON P140, manufactured by Arakawa Chemical Industries, Ltd.) in toluene was added to 133 g of the acrylic pressure-sensitive adhesive solution obtained in Example 1. Thereafter, they were mixed with stirring to obtain an aimed acrylic pressure-sensitive adhesive.

COMPARATIVE EXAMPLE 1

11 g of a 50% solution of hydrogenated petroleum resin (product name: ARKON P140, manufactured by Arakawa Chemical Industries, Ltd.) in toluene was added to 100 g of the acrylic copolymer solution obtained in Example 1. They were subsequently mixed with stirring to obtain an aimed acrylic pressure-sensitive adhesive.

(Fabrication of Pressure-Sensitive Adhesive Tape)

A solution of methylolpropanetolylene diisocyanate trimer adduct in ethyl acetate (solids content of 45 wt. %, product of Nippon Polyurethane Industry Co., Ltd., product name: CORONATE 45), as a crosslinking agent, was added to the pressure-sensitive adhesive compositions obtained in Examples 1 and 2 and Comparative Example 1 in the amount of 2.5 parts by weight, based on 100 parts by weight of the respective acrylic copolymer. After mixed homogeneously, each composition was coated on a surface of a 38 $\mu$m thick polyester film (product of Lintec Corporation, product number: #3811) to such a thickness that measured 25 $\mu$m when dried later. The subsequent drying at 110° C. for 5 minutes resulted in obtaining pressure-sensitive tapes.

(Measurement of SP Adhesion)

In accordance with the procedure of JIS Z 0237, a 25 mm width of each pressure-sensitive adhesive tape was applied to an SUS 304 panel, left to stand at 23° C. for 20 minutes and removed from the panel at an angle of 180 degrees at a pulling rate of 300 mm/min to measure a peel rate.

(Measurement of Adhesion to Polypropylene)

In accordance with the procedure of JIS Z 0237, a 25 mm width of each pressure-sensitive adhesive tape was applied to a polypropylene sheet, left to stand at 23° C. for 20 minutes and removed from the sheet at an angle of 180° at a pulling rate of 300 mm/min to measure a peel rate.

(Measurement of Adhesion to Oil Surface)

A stainless steel (SUS) panel was precoated with 6 g/m² of rust preventing oil and left to stand for one day to prepare an adherend. In accordance with the procedure of JIS Z 0237, a 25 mm width of each pressure-sensitive adhesive tape was applied to the adherend, left to stand at 23° C. for 20 minutes and stripped from the sheet at an angle of 180° at a pulling rate of 300 mm/min to measure a peel rate.

Measurement results for SP adhesion, adhesion to polypropylene (PP Adhesion) and adhesion to oil surface are shown in Table 1. As can be appreciated from Table 1, the acrylic pressure-sensitive adhesives show good adhesion to all of a metal surface, a polyolefin surface and an oil surface.

TABLE 1

|  | SP Adhesion (kg/25 mm) | PP Adhesion (kg/25 mm) | Adhesion to Oil Surface (kg/25 mm) |
|---|---|---|---|
| Example 1 | 1200 | 1000 | 700 |
| Example 2 | 1750 | 1370 | 830 |
| Comparative Example 1 | 570 | 280 | 10 |

EXAMPLE 3

450 g of butyl acrylate ester (BA), 60 g of "KRATON LIQUID Polymer L-1253" (product of Shell Chemical) as the olefinic copolymer (b) terminally modified with a free-radically polymerizable unsaturated double bond, 90 g of AA-6, designated in the trade and manufactured by Toagosei Co., Ltd., as the polymer (c) terminally modified with a free-radically polymerizable unsaturated double bond and having a number average molecular weight of 2,000–30,000 and a glass transition temperature of at least 30° C., 450.91 g of toluene as a solvent were blended in a 2 L separable flask equipped with a stirrer, cooling condenser, thermometer and nitrogen inlet. The resulting liquid-form monomer mixture was bubbled with nitrogen for 20 minutes to remove therefrom dissolved oxygen. An interior of the separable flask was subsequently substituted with a nitrogen gas. Then, the monomer mixture was elevated in temperature using a water bath while stirred at 100 rpm.

At the point when a reflux liquid appeared in the cooling condenser, 0.30 g of 1,1-di(t-hexylperoxy)-3,3,5-tri methyl cyclohexane (product name: PERHEXA TMH, manufactured by NOF Corp.) was dissolved in about 1 g of ethyl acetate and then added, as a polymerization initiator, to the monomer mixture to initiate boiling-point polymerization.

After the passage of one hour, 0.60 g of PERHEXA TMH was dissolved in about 1 g of ethyl acetate and again added to the mixture. After the passage of 2, 3 and 4 hours from the start of polymerization, 0.6 g, 1.20 g and 1.80 g of di(3,5,5-trimethylhexanoyl)peroxide (product name: PEROYL 335, manufactured by NOF Corp.), respectively dissolved in about 1 g of ethyl acetate, were added. The boiling-point polymerization was continued for 8 hours to obtain an acrylic copolymer.

EXAMPLE 4

The procedure of Example 1 was followed, except that the monomer mixture was used incorporating 450 g of butyl acrylate ester, 60 g of KRATON LIQUID Polymer L-1253, designated in the trade and manufactured by Shell Chemical, as the olefinic copolymer (b) terminally modified with a free-radically polymerizable unsaturated double bond and 1.3 g of glycidyl methacrylate as the polymerizable monomer (d), to obtain an acrylic copolymer (X-1).

Apart from the above, 450 g of methyl methacrylate (MMA), 4.14 g of mercaptoacetic acid and 0.45 g of azobisisobutyronitrile were blended in a 2 L separable flask equipped with a stirrer, cooling condenser, thermometer and nitrogen inlet. The following boiling-point polymerization resulted in obtaining a polymer (e) having a weight average molecular weight of about 10,000 and a glass transition temperature Tg=about 90° C.

Then, the above-obtained acrylic copolymer (X-1) and polymer (e) were mixed together and heated with stirring to allow them to react for 8 hours. As a result, an objective acrylic copolymer was obtained.

EXAMPLE 5

The procedure of Example 1 was followed, except that the monomer mixture was used incorporating 492 g of butyl acrylate ester, 18 g of acrylic acid as the polymerizable monomer (d), 90 g of AA-6, designated in the trade and manufactured by Toagosei Co., Ltd., as the polymer (c) terminally modified with a free-radically polymerizable unsaturated double bond and having a number average molecular weight of 2,000–30,000 and a glass transition temperature of at least 30° C. and 450.91 g of toluene as a solvent, to obtain an acrylic copolymer (X-3).

33 g of a 50 wt. % solution of an olefinic polymer (f) having an epoxy group at its one end (product name: KRATON LIQUID Polymer EKP-207, manufactured by Shell Chemical) in toluene was added to 100 g of the above-obtained acrylic copolymer solution. The subsequent mixing with stirring resulted in obtaining an objective acrylic copolymer.

EXAMPLE 6

Step 1

540 g of butyl acrylate ester (BA), 60 g of olefinic copolymer (b) terminally modified with a free-radically polymerizable unsaturated double bond (product name: KRATON LIQUID Polymer L-1253, manufactured by Shell Chemical Co.), 0.36 g of t-butyl peroxyallyl carbonate (product name: PEROMER AC, manufactured by NOF Corp.) as the compound (I) containing both a free-radically polymerizable unsaturated double bond and a peroxide bond in a molecule, 0.27 g of dodecylmercaptan (DDM) as a chain transfer agent, 0.30 g of benzyl methyl ketal (product name: IRGACURE, manufactured by Ciba Geigy Co.) as a photoinitiator and 490.91 g of toluene as a polymerization solvent were blended in a 2 L separable flask equipped with stirrer, cooling condenser, thermometer and nitrogen inlet.

The resulting liquid-form monomer mixture was bubbled with nitrogen for 20 minutes to remove therefrom dissolved oxygen. Then, the monomer mixture was further bubbled with nitrogen and stirred at a velocity of 100 rpm, during which time it was exposed to a 365 nm light at an intensity of 2 mW using a chemical lump to initiate polymerization. The start of polymerization was recorded at the point when the temperature elevation was observed. The polymerization reaction was continued for 4 hours.

Step 2

The polymer-toluene solution obtained in step 1, weighing 409 g, was charged into a 2 L separable flask equipped with stirrer, cooling condenser, thermometer and nitrogen inlet. 55.05 g of MMA monomer was added such that the polymer obtained in step 1 and methyl methacrylate (MMA) were blended in the solids ratio (weight ratio) of 80 to 20.

Also, 36.42 g of toluene as a polymerization solvent was added such that a total solids content amounted to 55% by weight.

The above-prepared liquid-form monomer mixture was bubbled with nitrogen for 20 minutes to remove therefrom dissolved oxygen. An interior of the separable flask was subsequently substituted with a nitrogen gas. Then, the monomer mixture was elevated in temperature using a water bath while stirred at 100 rpm. The start of polymerization was recorded at the point when a reflux liquid appeared in the cooling condenser. The boiling-point polymerization was continued for 4 hours. As a result, an objective acrylic copolymer was obtained.

COMPARATIVE EXAMPLE 2

510 g of butyl acrylate ester (BA) and 90 g of the polymer (c) terminally modified with a free-radically polymerizable unsaturated double bond and having a number average molecular weight of 2,000–30,000 and a glass transition temperature of at least 30° C. (product name: AA-6, manufactured by Toagosei Co., Ltd.) were used. The olefinic copolymer (b) terminally modified with a free-radically polymerizable unsaturated double bond (product name: KRATON LIQUID Polymer L-1253, manufactured by Shell Chemical) was excluded. Otherwise, the procedure of Example 3 was followed to obtain an acrylic copolymer.

COMPARATIVE EXAMPLE 3

510 g of butyl acrylate ester (BA) was used. The olefinic copolymer (b) terminally modified with a free-radically polymerizable unsaturated double bond (product name:

KRATON LIQUID Polymer L-1253, manufactured by Shell Chemical) and the polymer (c) terminally modified with a free-radically polymerizable unsaturated double bond and having a number average molecular weight of 2,000–30,000 and a glass transition temperature of at least 30° C. (product name: AA-6, manufactured by Toagosei Co., Ltd.), were excluded. Otherwise, the procedure of Example 3 was followed to obtain an acrylic copolymer.

COMPARATIVE EXAMPLE 4

The procedure of Example 4 was followed, except that the olefinic copolymer (b) terminally modified with a free-radically polymerizable unsaturated double bond (product name: KRATON LIQUID Polymer L-1253, manufactured by Shell Chemical) was excluded, to obtain an acrylic copolymer.

COMPARATIVE EXAMPLE 5

The procedure of Example 4 was followed, except that glycidyl methacrylate as the polymerizable monomer (d) having a functional group was excluded and that the polymer (e) was not used, to obtain an acrylic copolymer.

COMPARATIVE EXAMPLE 6

Butyl acrylate ester (BA) was used in the amount of 510 g. The polymer (c) terminally modified with a free-radically polymerizable unsaturated double bond and having a number average molecular weight of 2,000–30,000 and a glass transition temperature of at least 30° C. (product name: AA-6, manufactured by Toagosei Co., Ltd.) was used in the amount of 90 g. The olefinic polymer having an epoxy group at its one end (product name: KRATON LIQUID Polymer EKP-207, manufactured by Shell Chemical) was excluded. Otherwise, the procedure of Example 5 was followed to obtain an acrylic copolymer.

COMPARATIVE EXAMPLE 7

Butyl acrylate ester (BA) and acrylic acid were used in amounts of 582 g and 18 g, respectively. The polymer (c) terminally modified with a free-radically polymerizable unsaturated double bond and having a number average molecular weight of 2,000–30,000 and a glass transition temperature of at least 30° C. was excluded. Otherwise, the procedure of Example 5 was followed to obtain an acrylic copolymer.

COMPARATIVE EXAMPLE 8

Butyl acrylate ester (BA) was used in the amount of 600 g. The olefinic copolymer terminally modified with a free-radically polymerizable unsaturated double bond (product name: KRATON LIQUID Polymer L-1253, manufactured by Shell Chemical) was excluded. Otherwise, the procedure of Example 6 was followed to obtain an acrylic copolymer.

COMPARATIVE EXAMPLE 9

Butyl acrylate ester (BA) was used in the amount of 600 g. The olefinic copolymer terminally modified with a free-radically polymerizable unsaturated double bond (product name: KRATON LIQUID Polymer L-1253, manufactured by Shell Chemical) was excluded. In step 2, a butyl acrylate ester (BA) was used in the place of methyl methacrylate (MMA) Otherwise, the procedure of Example 6 was followed to obtain an acrylic copolymer.

Evaluation of Examples and Comparative Examples

Each of the acrylic copolymers obtained in Examples and Comparative Examples was coated on a surface of a 38 μm thick polyester film (product number #381, manufactured by Lintec Corporation) to a thickness of 15 μm and then dried at 110° C. for 5 minutes to thereby obtain pressure-sensitive tapes.

The following procedures were utilized to measure (1) SP adhesion, (2) adhesion to polyethylene and (3) holding power at 40° C. for the above-fabricated pressure-sensitive tapes.

(1) SP adhesion: According to JIS Z 0237, a 25 mm width of each pressure-sensitive adhesive tape was applied to a stainless steel panel (SUS 304 panel), left to stand at 23° C. for 20 minutes and removed from the panel at an angle of 180° at a pulling rate of 300 mm/min to measure a peel strength which was recorded as the SP adhesion.

(2) Adhesion to polyethylene: A 25 mm width of each pressure-sensitive adhesive tape was applied to a polyethylene resin panel (product name: HIZEX 1300J, manufactured by Mitsui Petro. Chem. Ind. Co., Ltd.) as a low-polarity adherend, left to stand at 23° C. for 20 minutes and removed from the panel at an angle of 180° at a pulling rate of 300 mm/min to measure a peel strength which was recorded as the adhesion to polyethylene.

(3) Holding Power at 40° C.: According to JIS Z 0237, a 25 mm×25 mm planar dimension of each pressure-sensitive adhesive tape was applied to a stainless steel panel (SUS 304 panel), left to stand at 23° C. for 20 minutes and aged in a thermostatic chamber controlled at 40° C. for one hour. Thereafter, a suspension load of 1 g was applied to measure a distance that the pressure-sensitive adhesive tape after one hour displaced or a time from application of the load till dropage of the load, which was recorded as the holding power at 40° C.

The results for (1) SP adhesion, (2) adhesion to polyethylene and (3) holding power at 40° are given in the following Table 2.

TABLE 2

| | Peel Strength (g/25 mm) | | Cohesion (mm/min.) Holding Power |
| --- | --- | --- | --- |
| | SP Adhesion | Adhesion to PE | at 40° C. |
| Ex.3 | 750 | 530 | 0.1 mm Displaced |
| Ex.4 | 800 | 620 | 0.1 mm Displaced |
| Ex.5 | 780 | 560 | 0.15 mm Displaced |
| Ex.6 | 680 | 500 | 0.05 mm Displaced |
| Comp.Ex.2 | 830 | 100(*1) | 0.2 mm Displaced |
| Comp.Ex.3 | 180(*1) | 30(*1) | Dropped After 10 min. |
| Comp.Ex.4 | 830 | 30(*1) | 0.1 mm Displaced |
| Comp.Ex.5 | 180(*1) | 420 | Dropped After 10 min. |
| Comp.Ex.6 | 830 | 100(*1) | 0.2 mm Displaced |
| Comp.Ex.7 | 180(*1) | 30(*1) | Dropped After 10 min. |
| Comp.Ex.8 | 830 | 100(*1) | 0.2 mm Displaced |
| Comp.Ex.9 | 180(*1) | 30(*1) | Dropped After 10 min. |

*1: Slippery Interfacial Peeling

EXAMPLE 7

An acrylic copolymer/toluene solution was obtained in the same manner as in Example 3. Toluene was removed from the solution by a conventional method to extract the acrylic copolymer.

High-density polyethylene (product designation: L4470, manufactured by Asahi Kasei Corp.) was formed into a 50 μm thick film. The above-obtained acrylic copolymer was coated on the high-density polyethylene film to a thickness of 10 μm. Further, they were thermally bonded to each other by hot pressing at 150° C. As a result, a pressure-sensitive adhesive film sheet was obtained incorporating a pressure-sensitive adhesive layer comprising the acrylic pressure-sensitive adhesive composition provided on a substrate comprising the high-density polyethylene film.

COMPARATIVE EXAMPLE 10

An acrylic copolymer/toluene solution was obtained in the same manner as in Comparative Example 3. Toluene was removed therefrom by a conventional method to extract the acrylic copolymer. Otherwise, the procedure of Example 7 was followed to obtain a pressure-sensitive adhesive film sheet incorporating a pressure-sensitive adhesive layer comprising the acrylic pressure-sensitive adhesive composition provided on a substrate comprising the high-density polyethylene film.

(Evaluation of Example 7 and Comparative Example 10)

The following procedures were utilized to evaluate initial adhesion, aged adhesion and weather resistance of the pressure-sensitive adhesive film sheets obtained in Example 7 and Comparative Example 10.

Measurement of Initial Adhesion

According to JIS Z 0237, a 25 mm width of each pressure sensitive adhesive film sheet was applied to an SUS 304 panel, left to stand at 23° C. for 20 minutes and removed from the panel at an angle of 180° at a pulling rate of 300 mm/min to measure a peel strength which was recorded as the initial adhesion.

Measurement of Aged Adhesion

According to JIS Z 0237, a 25 mm width of each pressure sensitive adhesive film sheets was applied to an SUS 304 panel, left to stand at 23° C. for 20 minutes, aged in a thermostatic chamber controlled at 23° C. or 40° C. for one week and removed from the panel at an angle of 180° at a pulling rate of 300 mm/min to measure a peel strength which was recorded as the aged adhesion.

Evaluation of Resistance to Weather and Light

According to JIS B 7753, each pressure sensitive adhesive film sheet was exposed to a light from a sunshine weather meter (WEL-SUN-HC, manufactured by Suga Test Instruments Co., Ltd.) for a period of 500 hours and removed from the panel at an angle of 180° at a pulling rate of 300 mm/min to measure a peel strength. This peel strength was used as an indication in evaluating the wether resistance and light resistance.

The results are given in the following Table 3.

TABLE 3

|  | Ex. 7 | Comp. Ex. 10 |
| --- | --- | --- |
| Initial Adhesion | 150 gf | 180 gf |
| Aged         23° C. | 240 gf | Adhesive Residue |
| Adhesion    80° C. | 300 gf | Adhesive Residue |
| Weather Resistance Evaluation | 320 gf | Adhesive Residue |

EXAMPLE 8

An acrylic copolymer/toluene solution was obtained in the same manner as in Example 3. Toluene was removed from the solution by a conventional method to extract the acrylic copolymer.

The hot-melt adhesive comprising this acrylic copolymer was measured for the physical properties as itemized below.

Cohesion

The hot-melt adhesive was cut into a 5×5×5 mm size to prepare a test strip. The test strip was applied to a vertically-held aluminum plate and placed in an 80° C. oven for 12 hours. Then, a sagging distance of the test strip was measured and recorded as the cohesion.

Melt Viscosity at 190° C.

A melt viscosity at 190° C. of the test strip was measured by a Brookfield viscometer (product of Tokimec Inc., velocity: 2.5 rpm, rotor: #HH4).

Adhesion

The hot-melt adhesive maintained at 190° C. was applied to a clean surface of a polyethylene panel (1.5 mm thick and 20 mm wide) to a thickness of 1 mm and a planar dimension of 10×20 mm. Then, its adhesive strength under shear was measured and recorded as the adhesion.

Oxidation Resistance

The hot-melt adhesive was cut into a 10×10 mm square and 2 mm thick test strip. The test strip was applied to a glass plate, placed in a 200° C. oven for 8 hours and then its color change was observed as an indication of oxidation resistance.

COMPARATIVE EXAMPLE 11

An acrylic copolymer/toluene solution was obtained in the same manner as in Comparative Example 3. Toluene was removed therefrom by a conventional method to extract the acrylic copolymer. This acrylic copolymer, in the form of a hot-melt adhesive, was measured for the physical properties in the same manner as in Example 8.

The results are given in the following Table 4.

TABLE 4

|  | Cohesion (mm) | Melt Viscosity at 190° C. (xE4) | Adhesion (kg/cm$^2$) | Oxidation Resistance (Visual Inspection) |
| --- | --- | --- | --- | --- |
| Ex.8 | 0 | 5.5 | 6.2 | Good |
| Comp.Ex.11 | 0 | 7.0 | 3.5 | Poor |

EFFECTS OF THE INVENTIONS

As stated above, the acrylic copolymers in accordance with the first through fifth inventions of the present application are of the structure in which various polymeric portions are grafted to the polymer backbone comprised mainly of the above-specified alkyl (meth)acrylate ester (a). This permits provision of acrylic copolymers having various properties by designing various combinations of the polymeric backbone portion and polymeric branch portions.

For example, combinations can be designed comprising the polymeric branch portions rendered low in polarity and the highly polar polymeric backbone portion comprised mainly of the alkyl (meth)acrylate ester (a). If derived from such combinations, acrylic pressure-sensitive adhesives exhibit good adhesion to adherends having varied polarities. Also, when designed to comprise polymeric portions of different polarities, acrylic copolymers can be suitably used as agents for dispersing polybutadiene rubber in an acrylonitrile-styrene copolymer resin or as impact modifying resins.

Also, selecting combinations of the polymeric backbone and branch portions properly, in terms of glass transition temperature, results in easy provision of acrylic copolymers suitable for use as various materials. For example, the formation of a continuous phase by the polymeric portions derived from polymers of high glass transition temperatures results in the provision of acrylic copolymers suitable for use as compounds requiring high resistance to heat and impact or as toner resins. On the other hand, the formation of a continuous phase by the polymeric portions derived from polymers of low glass transition temperatures results in the provision of acrylic copolymers suitable for use as films requiring high strength and elongation, hot-melt pressure-sensitive adhesives, thermoplastic elastomers or the like.

The acrylic pressure-sensitive adhesive compositions in accordance with the present invention are comprised chiefly of any of the acrylic copolymers in accordance with the first through fifth inventions. Accordingly, selecting combinations of the polymeric portions properly results in the provision of adhesive compositions which exhibit high adhesive properties to adherends varied in polarity over a wide range, including high- and low-polarity adherends, or which when cured exhibit heat resistance and low-temperature tackiness well-balanced at high levels.

The acrylic pressure-sensitive adhesive tape or sheet provided in the other aspect of the present invention is fabricated by integrating, via coextrusion, the polyolefinic substrate and pressure-sensitive adhesive layer comprised of the pressure-sensitive adhesive composition in accordance with the present invention. Accordingly, it can exhibit good adhesive properties and removability and non-staining properties well-balanced at proper levels, which rely on the pressure-sensitive adhesive composition in accordance with the present invention.

The acrylic hot-melt adhesives provided in the further aspect of the present invention are comprised chiefly of any of the acrylic copolymers in accordance with the first through fifth inventions. Accordingly, they exhibit good adhesive properties over a wide temperature range and further, when cured, exhibit good weather resistance and highly-balanced melt viscosity and cohesion. Hence, hot-melt adhesives can be provided which exhibit good adhesive properties and weather resistance and which are applicable for various uses.

What is claimed is:

1. An acrylic copolymer characterized as being prepared via copolymerization of (a) an alkyl (meth)acrylate ester containing 1–14 carbon atoms in the alkyl, (b) an olefinic polymer or copolymer terminally modified by a free-radically polymerizable unsaturated double bond and (c) a polymer terminally modified by a free-radically polymerizable unsaturated double bond and having a number average molecular weight of 2,000–30,000 and a glass transition temperature of at least 30° C.

2. An acrylic copolymer characterized as being prepared by grafting a polymer (e) to an acrylic copolymer made via copolymerization of (a) an alkyl (meth)acrylate ester containing 1–14 carbon atoms in the alkyl, (d) a polymerizable monomer containing one type of functional group selected from carboxyl, hydroxyl, epoxy and isocyanate and (b) an olefinic polymer or copolymer terminally modified by a free-radically polymerizable unsaturated double bond, said polymer (e) having at its one end a functional group reactive with the functional group in the polymerizable monomer (d) and also having a number average molecular weight of 2,000–30,000 and a glass transition temperature of at least 30° C.

3. An acrylic copolymer being prepared by grafting an olefinic polymer or copolymer (f) to an acrylic copolymer (X-2) made via copolymerization of (a) an alkyl (meth) acrylate ester containing 1–14 carbon atoms in the alkyl and (d) a polymerizable monomer containing one type of functional group selected from carboxyl, hydroxyl and isocyanate, said olefinic polymer or copolymer (f) having at its one end one type of functional group reactive with the functional group in the polymerizable monomer (d).

4. An acrylic copolymer characterized as being prepared by grafting an olefinic polymer or copolymer (f) to an acrylic copolymer (X-3) made via copolymerization of (a) an alkyl (meth)acrylate ester containing 1–14 carbon atoms in the alkyl, (d) a polymerizable monomer containing one type of functional group selected from carboxyl, hydroxyl, epoxy and isocyanate and (c) a polymer terminally modified by a free-radically polymerizable unsaturated double bond and having a number average molecular weight of 2,000–30,000 and a glass transition temperature of at least 30° C., said olefinic polymer or copolymer (f) having at its one end one type of functional group reactive with the functional group in the polymerizable monomer (d).

5. acrylic copolymer characterized as being prepared by:
   a first step wherein a compound (I) containing a free-radically polymerizable unsaturated double bond and a peroxide bond in a molecule, an alkyl (meth)acrylate ester (a) containing 1–14 carbon atoms in the alkyl and an olefinic polymer or copolymer (b) terminally modified by a free-radically polymerizable unsaturated double bond are allowed to undergo free-radical polymerization, with the aid of a photoinitiator, in the temperature range where the compound (I) is not caused to decompose; and
   a second step wherein a polymerizable monomer component (II) which differs in composition from the polymerizable monomer components used in the preceding free-radical polymerization is allowed to undergo free-radical polymerization, under the presence of the product of the preceding free-radical polymerization, in the temperature range where the compound (I) is caused to decompose.

6. The acrylic copolymer as recited in claim 1, wherein said olefinic polymer or copolymer (b) is an ethylene-butylene random copolymer or a propylene polymer terminally modified by a free-radically polymerizable unsaturated double bond.

7. The acrylic copolymer as recited in claim 2, characterized in that said olefinic polymer or copolymer (b) is an ethylene-butylene random copolymer or a propylene polymer terminally modified by a free-radically polymerizable unsaturated double bond, and that
   the functional group of said polymerizable monomer (d) is an epoxy group and the functional group of said polymer (e) is a carboxyl group.

8. The acrylic copolymer as recited in claim 3, characterized in that the functional group of said polymerizable monomer (d) is a carboxyl group.

9. The acrylic copolymer as recited in claim 3, wherein the functional group of said polymerizable monomer (d) is a carboxyl group and the functional group of said olefinic polymer (f) is an epoxy group.

10. The acrylic copolymer as recited in claim 5, wherein polymerizable monomer component (II) used in the second step has a glass transition temperature of at least 20° C.

11. An acrylic pressure-sensitive adhesive composition being comprised principally of the acrylic copolymer of claim 1.

12. The acrylic pressure-sensitive adhesive composition as recited in claim 11, characterized as further including a hydrogenated petroleum resin.

13. An acrylic pressure-sensitive adhesive tape or sheet being prepared by integrating, by extrusion, a polyolefinic substrate and a pressure-sensitive adhesive layer comprising the pressure-sensitive adhesive composition of claim 11.

14. An acrylic hot-melt adhesive comprised principally of the acrylic copolymer of claim 1.

* * * * *